(12) United States Patent  
Yoshida

(10) Patent No.: US 7,199,969 B2  
(45) Date of Patent: Apr. 3, 2007

(54) SHOCK PROTECTION CUSHIONING APPARATUS FOR PROTECTING A HARD DISK DRIVE FROM A SHOCK BY UTILIZING A ZERO-GRAVITY SENSOR

(75) Inventor: Toyoshi Yoshida, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 432 days.

(21) Appl. No.: 10/864,328

(22) Filed: Jun. 10, 2004

(65) Prior Publication Data

US 2005/0088773 A1   Apr. 28, 2005

(30) Foreign Application Priority Data

Oct. 24, 2003   (JP)   ............... 2003-365207

(51) Int. Cl.  
G11B 17/00   (2006.01)  
G11B 33/14   (2006.01)

(52) U.S. Cl. .................. 360/97.01; 360/97.02

(58) Field of Classification Search ............ 360/97.01, 360/97.04  
See application file for complete search history.

(56) References Cited

U.S. PATENT DOCUMENTS 5,982,573 A * 11/1999 Henze .................. 360/75

6,414,813 B2 * 7/2002 Cvancara .................. 360/77.02  
6,593,855 B2 * 7/2003 Fujino et al. .............. 340/683

FOREIGN PATENT DOCUMENTS

JP   2000-148300   5/2000  
JP   2003-263853   9/2003

* cited by examiner

Primary Examiner—A. J. Heinz  
(74) Attorney, Agent, or Firm—Wenderoth, Lind & Ponack, L.L.P.

(57) ABSTRACT

A shock protection apparatus which includes a zero-gravity sensor for detecting whether a hard disk drive is in a zero-gravity state. Upon the detection of a zero-gravity state, the zero-gravity sensor generates a zero-gravity detection signal. Subsequently, a head-slap sign detector outputs, to the hard disk drive, a signal for retracting a head if the hard disk drive is determined to be in the zero-gravity state as detected by the zero-gravity detection signal. In the shock protection apparatus, the influence of change over time of a shock-cushioning material is reduced, the difference in shock-resistant performance between operating and non-operating states is reduced, and signs of a head slap are detected promptly and properly so as to urgently retract the head.

2 Claims, 4 Drawing Sheets

DIRECTION OF DROP

SHOCK PROTECTION CUSHIONING APPARATUS FOR PROTECTING A HARD DISK DRIVE FROM A SHOCK BY UTILIZING A ZERO-GRAVITY SENSOR

BACKGROUND OF THE INVENTION

1. Field of the Invention

The present invention relates to a shock protection apparatus for a hard disk drive, and more particularly to a shock-cushioning apparatus for protecting a hard disk installed on a device from shocks as a result of the device being dropped.

2. Description of the Background Art

A hard disk drive (hereinafter referred to as a "HDD") is a device that stores or reproduces data in a desired storage location by moving its magnetic head to the desired location in a head load state where a predetermined amount of clearance (flying height) is maintained between the head and the surface of a disk rotating at high speed. To increase the recording density of HDDs, the distance of the flying height between the disk surface and the head slider surface is getting smaller year by year.

During the operation of a HDD, if a violent impact force in the vertical direction is applied to the recording surface of a disk, in particular, there is a high possibility of causing a phenomenon known as a "head slap" where the head slider hits the disk surface due to the head slider being displaced by a distance greater than the flying height. The head slap may cause physical damage to the recording surface of the disk or to the head, whereby it becomes impossible to store/reproduce data located in at least a damaged part of the disk. In the worst case, the entire recording surface of the disk may become unusable, i.e., the HDD may get damaged.

In the case where a HDD is installed on a stationary device, represented by a desktop computer, a violent impact force which may cause a head slap is rarely applied to the HDD. On the other hand, in the case where a HDD is installed on a portable device, represented by a notebook personal computer (hereinafter referred to as a "notebook PC"), it is not an exaggeration to say that the HDD is often subjected to a violent impact force. Specifically, because of the portability of notebook PCs, etc., the user can easily carry or move the notebook PC, etc. During carriage or moving, the user may accidentally bump or drop the notebook PC against or onto a hard surface. Since notebook PCs, etc., are designed to be compact and light-weight so as to ensure portability, such an impact force may be easily transmitted to the HDD incorporated in the computer, thereby damaging the HDD.

To avoid such a problem, a recent, small HDD which may be incorporated in a notebook PC or the like, is equipped with a head retracting mechanism to improve shock resistance during operation, in particular. For example, in a 2.5-inch HDD, during non-operation or even during operation in an idle state where there is no access request for a predetermined period of time, the head is retracted at a location away from the disk by a head unload operation. In the head unload operation, the head actuator is moved into a comb-shaped retract component, known as a "ramp", which is provided at a location away from the disk, and at this location the head actuator is locked by a magnetic latch structure provided at the lower part of the magnet yoke of a voice coil motor. In this manner, the aforementioned physical damage to the head or the disk surface caused by a violent impact force acting in the vertical direction on the recording surface of the disk can be avoided.

The aforementioned head retracting mechanism changes the shock resistance of the HDD by unloading the head in accordance with the change of the operation mode of the HDD. Specifically, when the HDD is in a mode where the HDD does not need to be located over the recording surface of the disk, the head is retracted from the disk, thereby preventing the occurrence of a head slap. On the other hand, during storage or reproduction, the head needs to be located over the recording surface of the disk, and thus the head is not retracted. Namely, shock protection of the HDD is realized by controlling the HDD such that the resistance of the HDD to an impact force of the same magnitude changes depending on the operation mode of the HDD.

Since the head is in a head load state not only during an access operation to the disk (i.e., the HDD is in an operating state) but also immediately after the access operation (i.e., the HDD is in a non-operating state), the occurrence of a violent impact force in the vertical direction being applied to the HDD immediately after the access operation, may produce a head slap, thereby damaging the head or the disk. That is, when the HDD is in a head unload state and at the time of changing its operation mode, the HDD cannot appropriately handle abrupt, violent impact forces.

FIG. 5 illustrates an exemplary shock-cushioning structure mounted to a HDD and having a shock-cushioning function which acts consistently regardless of whether the HDD is at the time of changing its operation mode, so as to protect the HDD from violent impact forces at all times. A shock-cushioning structure SU encloses apart or all of a HDD 1 with a shock-cushioning material, such as special elastic rubber or urethane sponge, so as to cushion shocks applied to the HDD 1. A shock-cushioning material 52 is used in the shock-cushioning structure SU to extend the duration of a shock, which is the length of time an impact force, caused as a result of the note PC dropped and crashed onto the ground or the like, is transmitted to the HDD 1 installed on the note PC, thereby reducing the peak value of a shock acceleration wave. The protection structure of the HDD 1 using a shock-cushioning material has been employed not only in notebook PCs but also in devices such as a compact, light-weighted MP3 recording/playing device having the HDD 1 installed thereon.

The shock-cushioning characteristics of such a shock-cushioning structure may be determined by the shock-resistant performance of a HDD 1 to be protected. The device specifications which indicate the shock-resistant performance of the HDD 1 specify shock resistance values for two states; an operating and non-operating states. Exemplary shock resistance specifications of a 2.5-inch HDD are as follows: The shock resistance specification (X/Y/Z directions) during operation is 200 G (the duration of action is 2 msec) and the shock resistance specification (X/Y/Z directions) during non-operation is 800 G (the duration of action is 1 msec).

The X/Y/Z directions indicate two directions (X/Y) which define the recording surface of a disk and a direction (Z) perpendicular to the recording surface of the disk. The impact force to be transmitted to the disk has a half-sine wave shock wave. The HDD 1 satisfying the above specifications can withstand a half-sine impact force of 800 G (gravity) acting in the X, Y, Z directions for a period of 1 msec during non-operation, and can withstand a half-sine impact force of 200 G for a period of 2 msec during operation.

Namely, in order to protect the HDD 1 from shocks, a shock-cushioning structure SU requires the function of cushioning impact forces so that an impact force of 200 G or greater cannot be applied to the HDD 1 during the operation of the HDD 1 and that an impact force of 800 G or greater cannot be applied to the HDD 1 during the non-operation. This will be described below by taking an example where a cushioning structure is used in which when the notebook PC is dropped from a height of 90 cm, an impact force of only 500 G at a maximum is applied to the HDD 1. That is, since the shock resistance specification during the non-operation is 800 G, the HDD 1 can withstand an impact force of 500 G with an allowance of another 300 G during the non-operation.

However, since the shock resistance specification during the operation is 200 G, the shock resistance falls short by as much as 300 G, with respect to an impact force of 500 G. Therefore, if an impact force of 500 G is applied to the HDD 1 during the operation, i.e., in a head load state, physical damage may occur due to a head slap phenomenon. That is, with this cushioning structure, the HDD 1 installed on the notebook PC cannot be protected from shocks resulting from drops of 90 cm, during the operation.

As shown in FIG. 4, in order that the HDD 1 can withstand drops of 90 cm during the operation, the amount of a cushioning material needs to be increased to lessen the shock to 200 G or lower, or the elastic modulus needs to be increased. However, it is very difficult to design a shock-cushioning structure which satisfies both operating and non-operating conditions.

On the other hand, the type of shock wave generated when the notebook PC incorporating the HDD 1 free falls can be a pulse wave with a short duration of action or can be a repeating pulse wave with a long period, rather than the a half-sine wave specified by the device specifications. The diversity of shock waves results from the material or rigidity of the cabinet (casing) of a notebook PC and/or the mounting structure of the HDD 1. With an increase in complexity of the shock wave to be actually generated, it is important to perform a series of product drop tests by actually dropping a device having the HDD 1 installed thereon, so as to select an appropriate mounting structure and shock-cushioning material based on the test results.

Further, in order to obtain a desired cushioning effect, a shock-cushioning material is compressed in advance by a predetermined pressure. This advance compression generates concerns about the deterioration of elasticity of the shock-cushioning material resulting from change over time. In addition, the change over time causes a decrease in the volume of the shock-cushioning material. That is, as a result the deterioration of elasticity and a decrease in volume, the shock-cushioning material would lose its originally-set desired cushioning effect.

In order to maintain a desired cushioning effect, it is necessary that the amount of change over time, which may cause elasticity deterioration, a volume decrease, a reduction in a cushioning effect, or the like, be estimated in advance so as to produce a shock-cushioning structure using an extra amount of a shock-cushioning material which corresponds to the estimated amount of change over time. However, the use of extra amount of a shock-cushioning material to compensate the change over time may become a great impediment to designing a compact, light-weighted notebook PC whose portability is very important.

As described above, problems in techniques for improving the shock-resistant performance of a HDD using a shock-cushioning material can generally be divided into the following two groups. The first problem is the necessity of estimating in advance a reduction in cushioning performance of a shock-cushioning material resulting from the change over time and adding a sufficient volume of the shock-cushioning material to compensate the estimated reduction in cushioning performance. To do so, the device having the HDD installed thereon needs a space therein for enclosing the added cushioning material, which hinders obtaining a compact and light-weighted device.

The second problem is that materials capable of providing a shock-cushioning effect which satisfies required specification values for both operating and non-operating conditions do not exist or are not yet in actual use, and thus are not available. This necessitates the use of a plurality of materials with different elastic moduli which are separately designed for operating and non-operating states, making the structure of a shock-cushioning structure complicated.

Further, a technique is suggested in which an acceleration sensor is used to avoid the occurrence of a head slap during the operation (i.e., during or immediately after an access of the head to the disk) in the aforementioned head retracting mechanism. In this technique, the acceleration sensor is incorporated in the HDD, and when the acceleration sensor senses a predetermined acceleration, the head is urgently retracted for unloading, regardless of the operation mode of the HDD. That is, in a conventional head retracting mechanism, the head is unloaded based on what is called an operation mode, i.e., based on the access condition of the head of the HDD to the disk recording surface, whereas in the aforementioned technique the movement of the HDD is perceived as acceleration and the magnitude of the perceived acceleration is perceived as the sign of a head slap to retract the head, thereby reducing the probability of delay in retracting timing of the head.

However, in practice, the acceleration applied to the HDD during free fall changes from 1 G to 0 G. Thus, it is nearly impossible for the acceleration sensor to detect such a small rate of change in acceleration. In order to amplify the rate of change in acceleration detected by the acceleration sensor, a signal processing circuit such as an amplifier circuit is required. In addition, regardless of whether the rate of change in acceleration is amplified or not, because the rate of change in acceleration to be detected is basically small, the threshold to determine whether the HDD is dropping or not needs to be set to a low value. However, if the threshold for determination is too low, even vibrations generated by the HDD itself or transmitted externally may also be falsely detected as a drop of the HDD. To prevent such a false detection, a special signal processing technique is required.

The head retracting mechanism which operates based on the operation mode of the HDD, the head retracting mechanism which operates based on the change in acceleration of the HDD, and the shock-cushioning structure using a shock-cushioning material, as discussed above, have problems protecting the HDD installed on a portable device, such as a notebook PC or information terminal, from shocks. To obtain a shock protection apparatus which can complement the aforementioned individual specific problems, it is desirable to combine a shock-cushioning structure and an emergency retracting mechanism for the head which operates based on detections of head-slap signs by means of an acceleration sensor.

Even with this combination, shock-cushioning materials which can absorb, by themselves, the difference of as much as 600 G between operating and non-operating states have not been yet found. Further, it is very difficult to construct a shock-cushioning structure using a plurality of shock-cushioning materials, which can absorb the difference of 600 G. Even if it is constructed, such a shock-cushioning structure is complicated and large in size and weight, and thus cannot be used in a portable device whose being compact and light-weight are important, as is the HDD to be protected. In addition, a problem resulting from degradation of the shock-cushioning properties of a shock-cushioning material due to the change over time cannot be solved. Further, it is obviously impossible to solve a problem resulting from the fact that the acceleration sensor cannot promptly and properly detect a head-slap sign of the HDD.

SUMMARY OF THE INVENTION

Therefore, an object of the present invention is to provide a shock protection apparatus for a hard disk, which employs a combination of a shock-cushioning structure using a shock-cushioning material and an emergency retracting mechanism which operates based on the detection of a head-slap sign. In the shock protection apparatus, the influence of change over time of a shock-cushioning material is reduced, the difference in shock-resistant performance between operating and non-operating states is reduced, and a head-slap sign is detected promptly and properly so as to urgently retract the head.

The present invention has the following features to attain the object mentioned above. A first aspect of the present invention is directed to a shock protection apparatus for protecting a hard disk drive from an impact force applied externally, the apparatus comprising: a zero-gravity sensor for detecting whether the hard disk drive is in a zero-gravity state and accordingly generating a zero-gravity (0 G) detection signal; and head-slap protection means for outputting to the hard disk drive a signal for retracting a head, if the hard disk drive is determined to be in a zero-gravity state as detected by the zero-gravity detection signal.

In the shock protection apparatus for a hard disk according to the present invention, by combining an emergency retracting mechanism which operates promptly and properly based on the detection of a head-slap sign by means of a zero-gravity sensor, and a shock-cushioning structure using a shock-cushioning material, the change over time can be accommodated using a minimum amount of a shock-cushioning material, and the difference in shock protection requirements between the operating and non-operating states of the hard disk drive can be accommodated. This makes it possible to protect the hard disk drive installed on a portable device utilizing a compact and light-weighted design.

These and other objects, features, aspects and advantages of the present invention will become more apparent from the following detailed description of the present invention when taken in conjunction with the accompanying drawings.

DETAILED DESCRIPTION OF THE INVENTION

Figure 1:
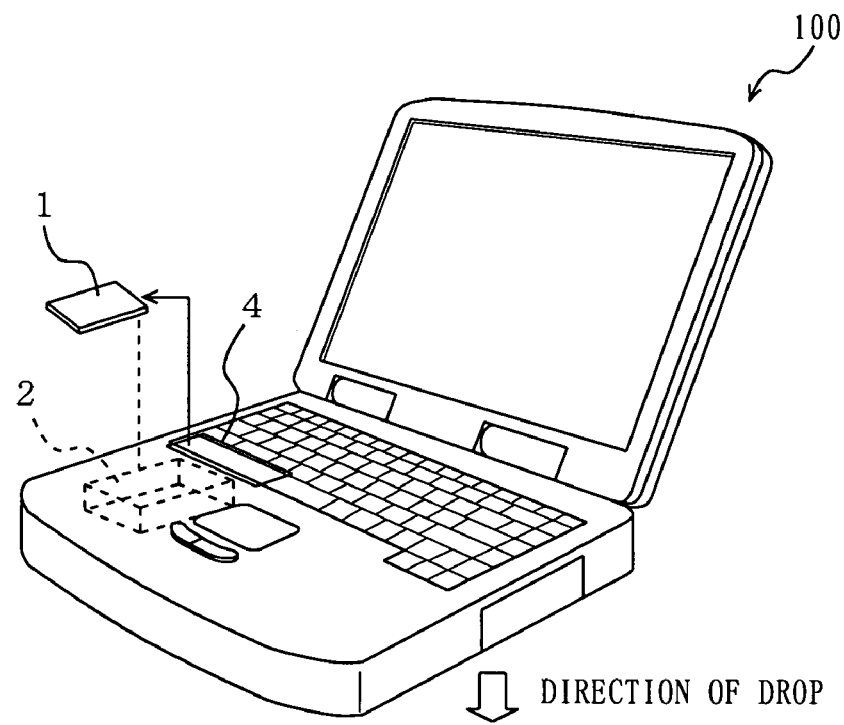
FIG. 1 is a partial exploded perspective view of a hard disk protection apparatus, according to the present invention, incorporated in a notebook personal computer.

FIG. 1 shows an example wherein a shock protection apparatus for a hard disk drive is, according to the present invention, incorporated in a notebook PC. A HDD 1 is enveloped by a shock-cushioning material 3 (not shown) and mounted in a HDD pack 2. The HDD pack 2 and a head-slap sign detector 4 are installed on a notebook PC 100. The shock-cushioning material 3 has characteristics such as low stiffness and low resilience. The shock-cushioning material 3 holds the HDD 1 so as to be enveloped thereby and installed in the HDD pack 2, and protects the HDD 1 from shocks.

Figure 2:
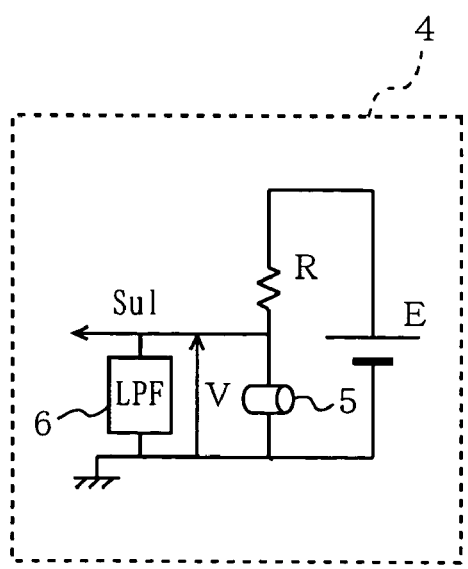
FIG. 2 is a block diagram illustrating a configuration of a head-slap sign detector shown in FIG. 1.

As shown in FIG. 2, the head-slap sign detector 4 generates an emergency unload signal Sul by means of a zero-gravity (0 G) sensor 5 and outputs the signal Sul to the HDD 1. A low-pass filter (LPF) 6 is provided to prevent chattering caused by the zero-gravity sensor 5 intermittently sensing a pseudo acceleration, which is similar to that generated at the time of a drop, generated when vibration is applied to the zero-gravity sensor 5 in a sensing direction thereby sending an undesired emergency unload signal Sul. The zero-gravity sensor 5 includes therein a floating element disposed such that the ends of the floating element come in contact with different terminals, respectively. The floating element can be easily released from the terminals by the application of an external force such as vibration thereto. That is, the zero-gravity sensor 5 does not detect acceleration having applied thereto, as does an acceleration sensor, but has the function of sensing a zero-gravity state by detecting when a circuit comprising the floating element and the terminals has been cut while the floating element is released from the terminals and floating in the air.

First, the principles of head-slap sign detection of a HDD of the present invention will be described. The principles of detection of free fall will be described. A head-slap sign is detected by the zero-gravity sensor 5 sensing that the HDD 1 has entered in a zero-gravity state. Specifically, generally, when an object is free falling, gravitational acceleration g (9.8 m/s$^2$) is always acting on the object regardless of the location of the object. The free-fall time t (sec) of an object which loses an external constraint at an initial rate of 0 and free falls straight down from a height h (m), can be calculated by the following equation (1), neglecting air resistance:

$$t = \sqrt{(2\ h/g)} \qquad (1)$$

Figure 3:
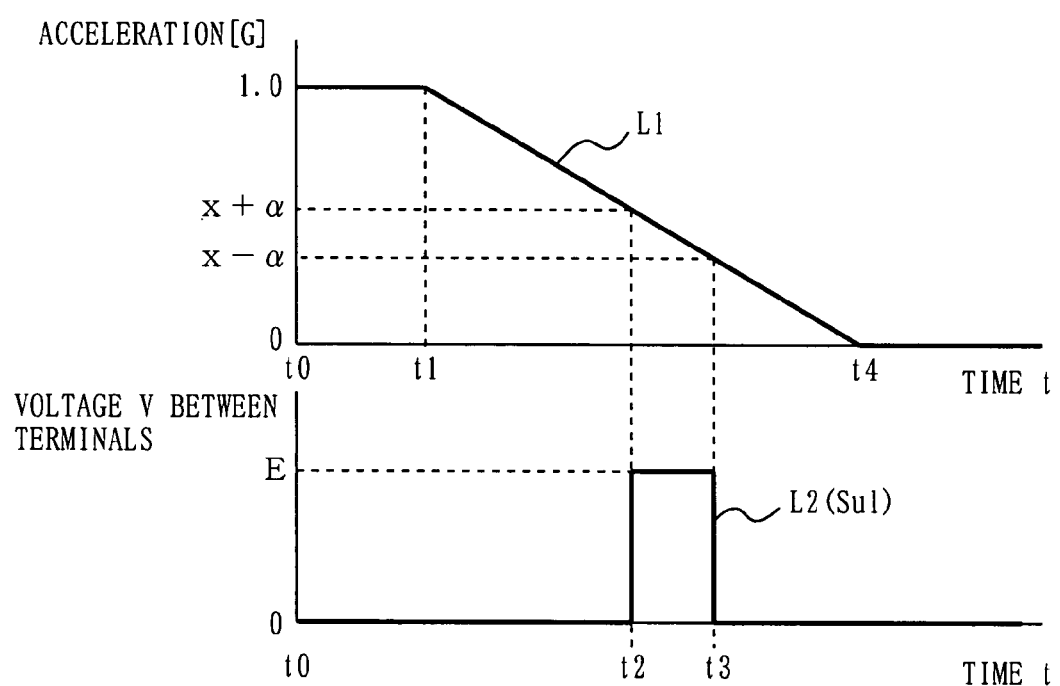
FIG. 3 is a diagram for illustrating the relationship between a state of a drop of a hard disk drive shown in FIG. 1 and an emergency unload signal output from the head-slap sign detector shown in FIG. 2.
Figure 4:
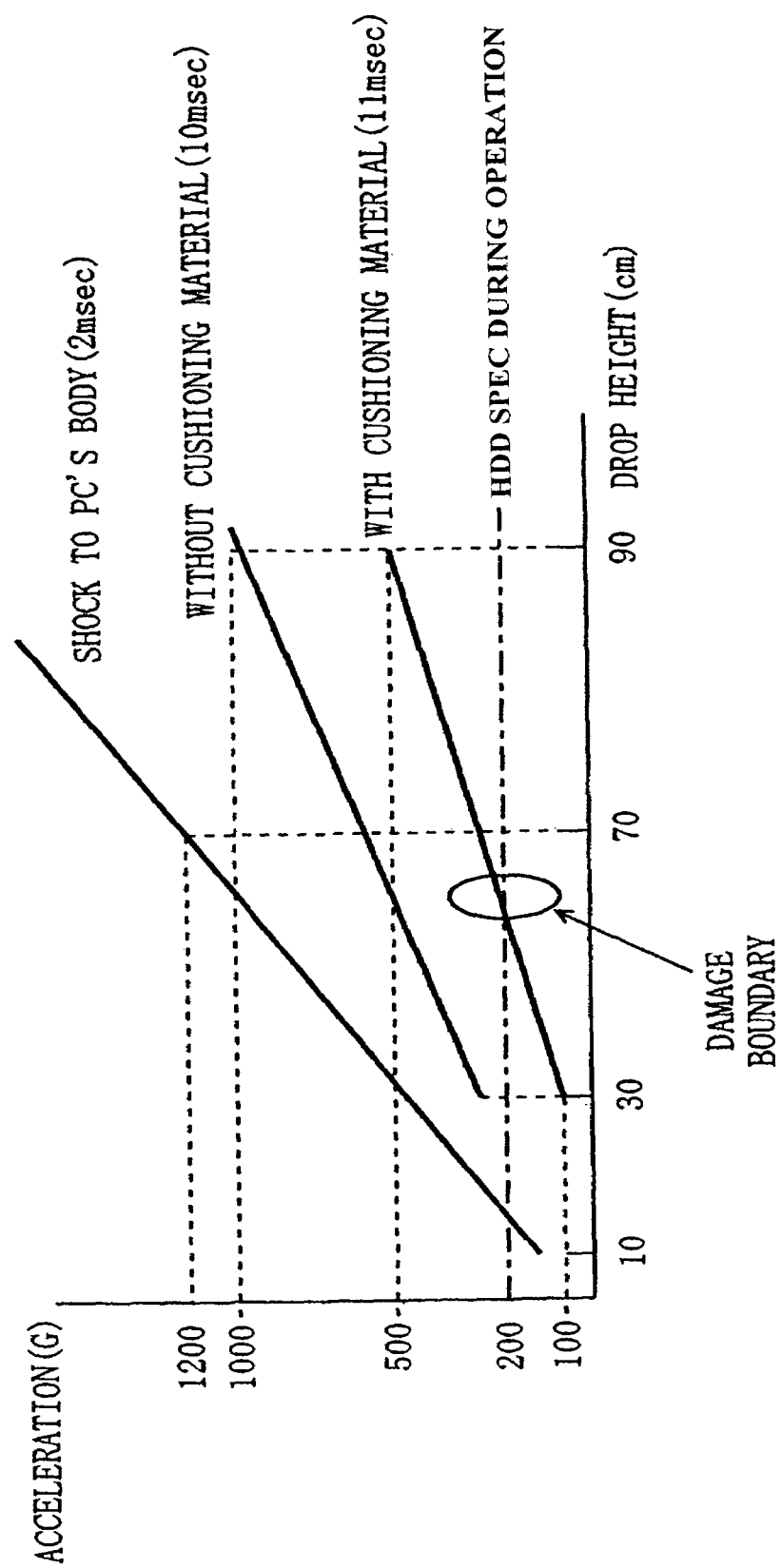
FIG. 4 is a diagram illustrating the characteristics of a shock-cushioning material which satisfies shock protection requirements for both operating and non-operating conditions of the hard disk drive.
Figure 5:
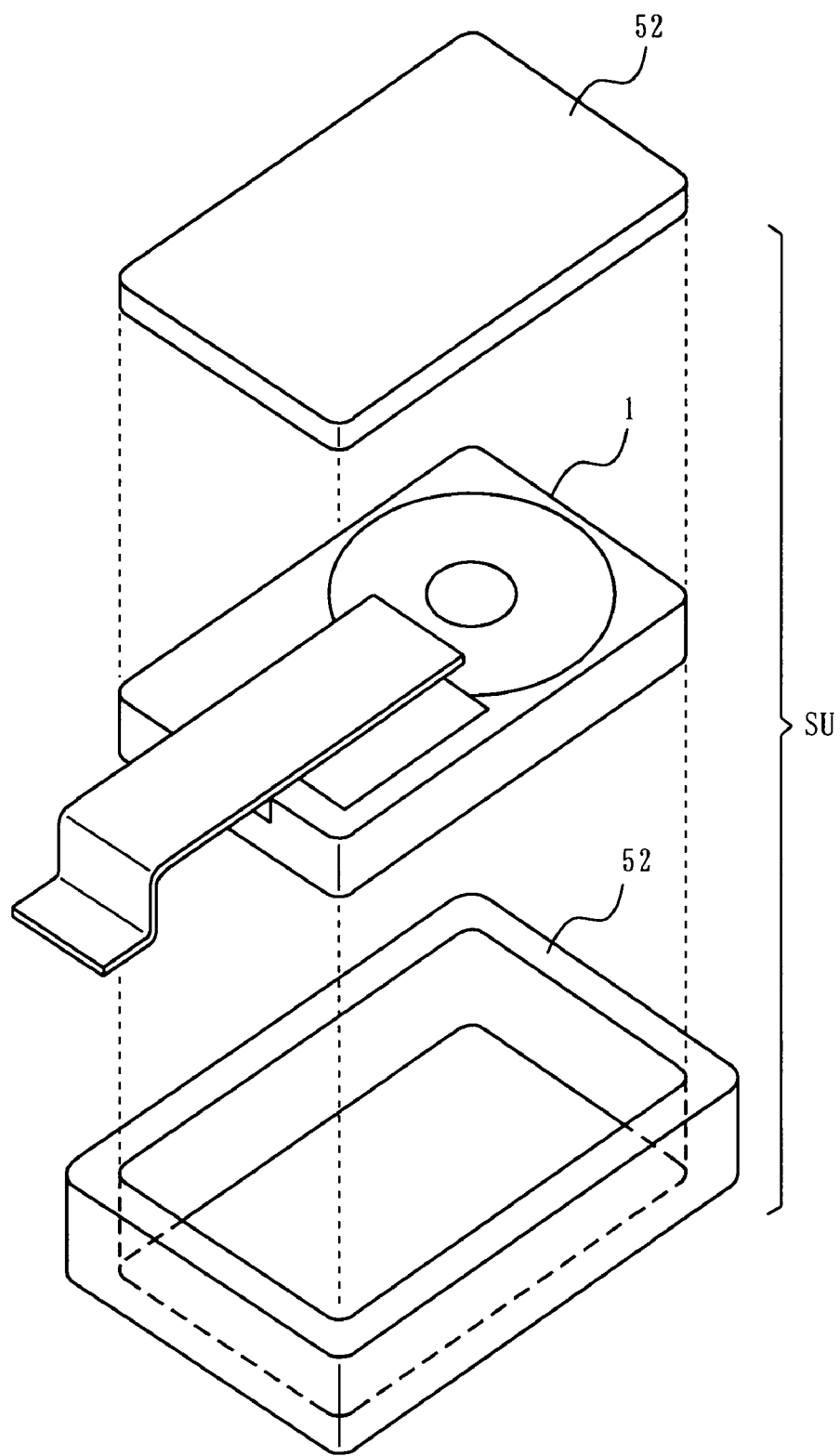
FIG. 5 is a perspective view of a shock-cushioning structure for a hard disk drive constructed by using a shock-cushioning material.

FIG. 3 shows electric characteristics of the zero-gravity sensor 5. In the drawing, a line L1 indicates the temporal change in acceleration acting on the HDD 1 and the zero-gravity sensor 5 during free fall. The HDD 1 and the zero-gravity sensor 5 stand still at a location of the height h during times t0 to t1, and start to free fall at time t1 and ends the free fall at time t4. A line L2 indicates the temporal change in the voltage level of an emergency unload signal Sul output from the zero-gravity sensor 5 during times t0 to t4.

At time t0, the HDD 1 and the zero-gravity sensor 5 stand still, and therefore the zero-gravity sensor 5 mounted on HDD 1 is in the ON state. Thus, a voltage between the terminals of the zero-gravity sensor 5 of 0 V is output as an emergency unload signal Sul.

At time t1, the HDD 1 having the zero-gravity sensor 5 mounted thereon starts to free fall. At this point, the zero-gravity sensor 5 is still in the "ON" state. Accordingly, the voltage level of the emergency unload signal Sul at this time is also still 0.

At time t2, the HDD 1 and the zero-gravity sensor 5 are free falling at an acceleration of (x+α). At this time, the zero-gravity sensor 5 senses a zero-gravity state and enters the "OFF" state. Accordingly, a voltage E between the terminals of the zero-gravity sensor 5 is output as an emergency unload signal Sul.

At time t3, the HDD 1 and the zero-gravity sensor 5 are free falling at an acceleration of (x−α). At this time, the zero-gravity sensor 5 returns to the "ON" state without sensing a zero-gravity state. Accordingly, the voltage level of the emergency unload signal Sul returns to 0.

Specifically, at the point where the zero-gravity sensor 5 obtains a free-fall acceleration of (x+α), the floating element included in the zero-gravity sensor 5 floats and is released from the internal terminals, thereby sensing a zero-gravity state. Then, at the point where the zero-gravity sensor 5 obtains a free-fall acceleration of (x−α), the floating element having been floating returns and is connected to the internal terminals, thereby sensing that the zero-gravity sensor 5 has returned to a gravity state from a zero-gravity state.

While the zero-gravity sensor 5 is in the "OFF" period (i.e., times t2 to t3), a power voltage E (i.e., a voltage between the terminals of the sensor) is output as the emergency unload signal Sul. The voltage E between the terminals of the sensor is directly output as an emergency unload signal Sul. That is, an emergency unload signal Sul is output to the HDD 1 after time $\Delta t = t2-t1$ from the start of free fall.

In response to the emergency unload signal Sul, the HDD 1 performs a head unload operation in the following manner. In a process P1, when the HDD 1 receives an emergency unload signal Sul which is a high-level emergency unload signal Sul, the HDD 1 suspends the currently executing process. Specifically, in the case where the data transfer process is being executed, the HDD 1 requests the host to suspend the transfer and maintains BUSY status while processing data in a buffer.

In a process P2, the HDD 1 temporarily saves all the process information being used prior to suspension, on work memory and then performs an emergency unload process of the head actuator.

In a process P3, after a lapse of a predetermined time from the process P2, the HDD 1 restores the process information having been temporarily saved and continues execution of a suspended process assigned by the host.

If the emergency retract time required to execute the processes P1 and P2 is defined as "tx", the time from when an object starts to drop until it reaches the ground requires the time "$\Delta t + tx$" or more.

By the equation (1), the equations (2) and (3) can be obtained:

$$\sqrt{(2\ h/g)} > \Delta t + tx \quad (2), \text{ i.e.,}$$

$$h > 0.5\ g(\Delta t + tx)^2 \quad (3)$$

This indicates that shock avoidance by the emergency unload operation can be possible only with such heights that satisfy the equation (3).

Now, the lower limit of height h0 for the case of using a zero-gravity sensor 5 in which $\Delta t = 80$ msec is determined. The time required for the HDD 1 to suspend the process (process P1) depends on a disk write operation. Specifically, a transition to an emergency retract operation after data, which has been transferred into a data buffer from the host, has been written to a disk is important in terms of ensuring data reliability, and thus the time required for the transition becomes substantially predominant.

A trial calculation of the time required for the process P1 will be described. Assuming that a HDD 1 has one 2.5-inch disk, two heads, and a capacity of 20 GB. In addition, the HDD 1 is configured such that the internal transfer rate is 160 to 290 Mb/sec, the data buffer capacity is 2048 KB (which is equally divided into a read capacity and a write capacity), the disk rotation rate is 4200 rpm (the average rotational latency=7 msec), the innermost zone has 400 physical sectors per track, the one track seek time is 2 msec, and the sector capacity is 512 B.

During reading, even if data transfer is suspended, recorded data cannot be corrupted. Assuming that data being written to the cache is fully stored, the time required to write all the data to the disk is calculated. A write operation in the innermost zone takes the longest time, and thus in the case of writing a full capacity of a write buffer of 1 MB (2000 sectors), the number of tracks to write is 2000/400=5 tracks, and the internal transfer rate in the innermost is 160 Mb/sec (20 MB/sec). Therefore, to write 400 sectors of data, it takes $512 \times 8$ (bits)$\times 400 \div 160E6 = 10.2$ msec. Since the time required for one rotation of the disk is 14 msec or less, one track of data can be written per rotation. Hence, it requires $5 \times 14$ msec=70 msec just to write data.

The time required to write 1 MB data in the innermost zone is determined by adding up two times of track-to-track seeks (because the HDD 1 has two heads) and the average rotational latency (which is the average time for the head to reach the desired sector when moving to another track) 7 msec×5 times.

That is, the time required to write 1 MB data in the innermost $$\begin{aligned} \text{zone} &= (1\ \text{MB data write time}) + (\text{track-to-track seek time}) \times \\ &\quad 2\ (\text{times}) + (\text{average rotational latency}) \times 5\ (\text{times}) \\ &= 70 + 2 \times 2 + 7 \times 5 \\ &= 109\ \text{msec} \end{aligned}$$

A trial calculation of the time required for the process P2 will be described. The time it takes to unload the head from the innermost zone is typically known to be on the order of 50 msec at a maximum. Therefore, the emergency retract time tx for HDD 1 is such that tx=109+50=159 msec. Based on the equation (3), the lower limit of height h0, which is the lower limit height, is determined.

Lower limit of height $h0 = 0.5 \times 9.8 \times (80E-3 + 159E-3)^2 = $ about 0.28 (m)

Thus, if the HDD 1 is dropped from a location lower than this lower limit of height h0 (i.e., about 0.28 (m)), the zero-gravity sensor will not exert its effect.

However, in the case where the aforementioned shock-cushioning structure SU using a shock-cushioning material 52 is employed, even if the HDD 1 is dropped from a height of about 30 cm, because the shock acceleration applied to the HDD 1 is about 100 G, the emergency retract function of the zero-gravity sensor can be compensated by the shock-cushioning material in a height range of the lower limit of height h0 or lower.

In the above-described calculation, the lower limit of height h0w is determined for the worst case for which the above-described method of the present invention effectively works. The worst case is assumed where the write operation is suspended when the head is located in the innermost data zone which is the farthest from the unload retract location, i.e., this case requires the longest time to accomplish an emergency unload process. Now, a trial calculation of the lower limit of height h0b for the best case where the head is located at the outermost, i.e., the case where the time required for emergency retract is the shortest, is carried out. Recent HDDs have a large capacity and thus it is presumed that in actual use there is a greater chance of accessing a data zone from the outermost to middle tracks.

The calculation of the emergency retract time required for an emergency unload operation from the outermost head position (i.e., the case of an emergency unload from the outermost zone) is different from the above-described calculation of the emergency retract time from the innermost head position in the following elements. Specifically, the internal transfer rate is 290 Mb/sec instead of 160 Mb/sec, the number of sectors per track is 720 instead of 400, and the time required for the process P2 is 30 msec instead of 50 msec.

As is the case with an emergency unload from the innermost head position, the case of writing 1 MB write data which is cached in a buffer is described. The time required to write 720 sectors of data is 512×8 bits×720÷290E6=10.17 msec, and one rotation takes 14 msec or less. Writing of 1 MB=2000 sectors of data equals to 2000÷720=about 2.8 tracks of data, and thus the outermost data write time is determined by adding up one time of track-to-track seek and three times of the average rotational latency.

$$\text{Outermost data write time} = (1 \text{ MB data write time}) +$$
$$(\text{track-to-track seek time}) \times 1 \text{ (time)} +$$
$$(\text{average rotational latency}) \times$$
$$3 \text{ (times)}$$
$$= (2.8 \times 14) + 2 + 7 \times 3$$
$$= 62.2 \text{ msec}$$

By further adding the time 30 sec which is required for the process P2 to the above result, $tx=62.2+30=92.2$ msec is determined.

By the equation (3), in the case of a head emergency retract from the outermost, the lower limit of height h1 is determined as follows.

Lower limit of height $h1=0.5\times9.8\times(80E-3+92.2E-3)^2$ =about 0.15 (m)

As described above, the lower limit location for the drop height of a HDD which can be supported by the emergency head retract technique using a zero-gravity sensor according to the present invention, depends on the head position.

That is, the lower limit range of height $$\Delta h = h0 - h1$$
$$= 0.28 - 0.15$$
$$= 0.13 \text{ (m)},$$

and thus a height allowance of 0.13 (m) is made. By the height allowance, it is possible to reduce the volume of a shock-cushioning material to be used and to simplify the shock-cushioning structure, whereby the aforementioned problems can be solved. In addition, by adjusting the sensitivity of a zero-gravity sensor to reduce $\Delta t$, it is possible to increase the lower limit range of height $\Delta h$, thereby providing a wider selection range of shock-cushioning material.

Although the greatest effect of the present invention is that by retracting the head the shock-resistant performance level of a HDD during the operation is increased from 200 G to a level equivalent to 800G which is the shock-resistant performance level during the non-operation, the above-described effect of eliminating the need to increase the initial amount of a shock-cushioning material in view of change over time is also a great effect.

The upper limit of a drop height is determined by the performance of a shock-cushioning material. By using a material with a higher elastic modulus, the upper limit of height can be increased. In addition, use of a plurality of zero-gravity sensors improves the shock-resistant performance during the operation with respect to drops in the forward, backward, left, and right directions, as well as in the downward direction, by an emergency head retract.

In the HDD 1 according to the present invention, as described above, regardless of the operation mode, more specifically, regardless of whether data is being written or read, when the HDD 1 receives an emergency unload signal Sul, the HDD 1 suspends the currently executing operation so as to urgently retract the head. A HDD equipped with a conventional head retracting mechanism does not have the functionality of being able to urgently retract the head in response to an interface signal. Therefore, if the present invention is applied to such a HDD, in response to an emergency unload signal Sul, the HDD can only turn off the power.

If the power is turned off during a write operation, a loss of data may occur and functional operation failures may possibly occur later on. Thus, the HDD 1 according to the present invention needs to be configured such that when the HDD 1 receives an emergency unload signal Sul, the HDD 1 suspends the currently processing operation without turning off the power so as to perform an emergency head retract process and resume the suspended process later on. Note that such a HDD can be easily obtained by using known techniques and thus a detailed description thereof will be omitted here. The present invention can be applied to obtain shock protection for hard disk drives installed on portable information devices, such as notebook PCs and compact, light-weight MP3 players.

While the invention has been described in detail, the foregoing description is in all aspects illustrative and not restrictive. It is understood that numerous other modifications and variations can be devised without departing from the scope of the invention.

What is claimed is:

1. A shock protection apparatus operable to protect a hard disk drive from an externally applied impact force, said shock protection apparatus comprising:

a zero-gravity sensor operable to detect whether the hard disk drive is in a zero-gravity state and operable to generate a zero-gravity detection signal if the hard disk drive is in the zero-gravity state;

a head-slap protection unit operable to output a retraction signal, if said zero-gravity sensor generates a zero-gravity detection signal as a result of the hard disk drive being in a zero-gravity state, so as to initiate a retraction of a head from a hard disk of the hard disk drive; and a shock cushioning and holding member, having a low stiffness and resilience, encasing and holding the hard disk drive so as to protect the hard disk drive from a shock or multiple shocks;

wherein the hard disk drive is operable to retract the head from the hard disk so as to increase a distance between the head and the hard disk within a total time period corresponding to a sum of time periods P1, P2, and P3;

wherein time period P1 is a time from when the hard disk drive begins free fall until a time when the retraction signal is output by said head-slap protection unit;

wherein time period P2 is a time from when the retraction signal is output by said head-slap protection unit until a time when a write operation of data being written to the hard disk is finished;

wherein time period P3 is a time required to retract the head; and wherein a shock resistance, of said shock cushioning and holding member is determined based on (i) a lower limit of height at which said zero-gravity sensor and said head-slap protection unit are operable to output the retraction signal, the lower limit of height being calculated based on the total time period, and (ii) a shock acceleration of the hard disk drive calculated based on the lower limit of height.

2. The shock protection apparatus according to claim 1, wherein the hard disk drive is operable to suspend a currently executing operation in response to the zero-gravity detection signal, regardless of whether data is being read or written by the head, and to subsequently retract the head.

* * * * *